United States Patent [19]

Gross

[11] 4,115,727
[45] Sep. 19, 1978

[54] BRAKING SYSTEM FOR THREE PHASE MOTORS

[76] Inventor: Thomas A. O. Gross, Concord Rd., R.F.D., Lincoln, Mass. 01773

[21] Appl. No.: 756,640

[22] Filed: Jan. 4, 1977

[51] Int. Cl.² ............................................. H02P 3/20
[52] U.S. Cl. .................................................... 318/212
[58] Field of Search ........................ 318/209, 211, 212

[56] References Cited

U.S. PATENT DOCUMENTS

| | | | |
|---|---|---|---|
| 2,818,539 | 12/1957 | Johnson | 318/212 X |
| 2,929,977 | 3/1960 | Choudhury | 318/212 |
| 3,486,097 | 12/1969 | Shekro | 318/212 X |
| 3,809,979 | 5/1974 | Zarth | 318/212 |

*Primary Examiner*—Gene Z. Rubinson
*Attorney, Agent, or Firm*—John W. Ericson

[57] ABSTRACT

A braking system for three phase motors without an accessible neutral terminal comprising a current limiting motion detection circuit that is energized when the motor is energized or is being supplied with braking current as long as the rotor is in motion, a DC braking circuit, and a control circuit actuated by a stop command that disconnects the source from the motor and supplies braking current until the rotor comes to a stop. A ferroresonant motion detection circuit is disclosed that is also useful in braking systems for other motor types.

8 Claims, 3 Drawing Figures

BRAKING SYSTEM FOR THREE PHASE MOTORS

This invention relates to electric motors, and particularly to a novel braking circuit for three phase motors.

In U.S. Pat. No. 3,798,523, issued to me on Mar. 19, 1974 for Single Phase Induction Motor Brake, there is described a braking system for single phase induction motors in which the phase shifting capacitor is used as the current limiting impedance in a rectifying circuit that supplies DC braking current to the motor when a stop switch is closed. This circuit produces rapid braking of the motor, but requires judgment on the part of the operator to avoid damaging heating of the motor by the DC braking current after the motor has come to a stop.

An effective solution to this problem, applicable to single phase motors or to Y-connected three phase motors with an accessible neutral terminal, is disclosed in U.S. Pat. No. 3,872,363, issued to me on Mar. 18, 1975 for Electric Motor Braking System. The braking system described in that patent depends on the fact that a pulsating DC braking current supplied to the run winding of a single phase motor is coupled to the start winding only when the rotor is moving relative to the stator. The induced voltage across the run winding is sensed, and braking is terminated when the induced voltage goes below a predetermined value. This system is also applicable to three phase motors of the Y-connected type in which a center tap is available, since any of the phases has a voltage induced in it when the other two are excited by a DC braking current only until the motor stops. The same considerations would apply if the braking current was supplied between any external terminal and neutral, in which case the signal voltage would be taken across the other two external terminals.

A problem encountered in automatic braking systems of the type just described in that the voltage induced during braking with DC current is very large compared with the voltage induced near zero motion of the rotor, where it is desired to stop the flow of braking current. One object of my invention is to facilitate a more critical determination of the time when the motor has stopped without introducing the complexity and expense of operational amplifiers, reference voltage sources, and the like.

Many available Y-connected motors, and all delta connected motors, lack a neutral terminal. In these motors, DC braking current supplied to any pair of available terminals produces a voltage across any other pair of available terminals whether or not the rotor is in motion. One approach to this problem is to use a manually controlled braking switch, as in the above-cited U.S. Pat. No. 3,798,523. Another solution is to use a timer to terminate the braking function, as described, for example, in *Design News*, published on Apr. 7, 1975 by Cahners Publishing Co., Inc. Since the timer must be designed to be sure that the motor has stopped before the braking current is interrupted, either of these approaches will generally leave braking current flowing in the motor for more or less time after the motor has stopped. Current flowing under these conditions can cause destructive heating of the motor.

A primary object of this invention is to enable a three phase motor without a neutral connection to be braked abruptly to a stop without allowing any appreciable flow of current when motion has ceased.

Briefly, the above and other objects of the invention are attained by a novel braking system in which braking current is supplied to any pair of terminals of a Y- or delta connected motor. A null sensing circuit, comprising a pair of impedances, preferably capacitors, is connected in series across the same pair of motor terminals, the junction of the impedances is connected through a voltage sensing circuit, preferably an inductive circuit such as the primary winding of a transformer or the winding of a relay, to the third terminal of the motor. A switching circuit is controlled by the voltage sensing element to terminate braking current when the voltage induced across the terminals of the sensing circuit falls to a threshold value. In accordance with the invention in its preferred embodiment, in which the null sensing circuit includes two capacitors and an inductive element, the inductive element is made ferroresonant to the capacitor at the threshold value of the induced voltage.

The manner in which the apparatus of the invention is constructed, and its mode of operation, will best be understood in the light of the following description, together with the accompanying drawings, of various illustrative embodiments.

Figure 1:
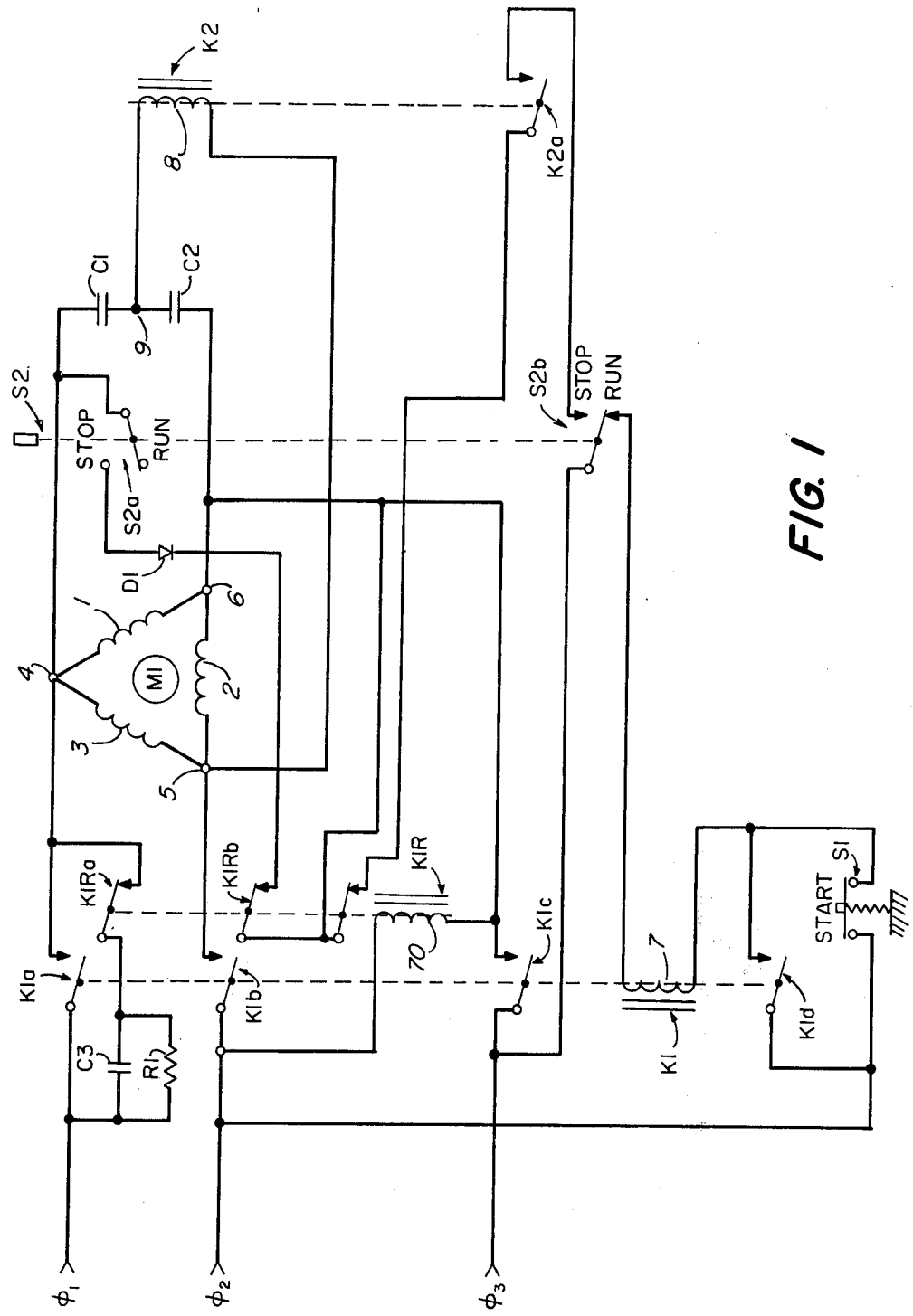
FIG. 1 is a schematic wiring diagram of a brake control system for a three phase motor in accordance with a first embodiment of my invention.

FIG. 1 shows a brake control system for a delta-connected motor M1 having windings 1, 2 and 3 with accessible terminals 4, 5 and 6. The motor M1 could be Y-connected without any change in the control circuits to be described.

A conventional 3-phase source is indicated by its supply terminals $\phi 1$, $\phi 2$ and $\phi 3$. The source may be any conventional 120, 240 or 480 volt, 50 or 60 Hz source, or the like, through the simple control circuit of FIG. 1 is best adapted to a 120 volt source for relatively small motors.

Operating current for the motor M1 is at times supplied from the source terminals $\phi 1$, $\phi 2$ and $\phi 3$ under the control of a conventional double pole, double throw, manually operated toggle stop switch S2, a manually operated; normally open spring-returned pushbutton start switch S1, and a conventional motor control contactor K1. The stop switch S2 has contacts S2a and S2b shown in the position in which the motor M1 is enabled to be run.

The contactor K1 has four normally open front contacts K1a, K1b, K1c and K1d, arranged to be closed when current is supplied to the winding 7 of the contactor K1. Current is supplied to the winding 7 of the contactor K1 when a pickup circuit is completed that extends from the supply terminal $\phi 2$ over the contacts of the start switch S1, through the winding 7, and thence over the normally closed contacts S2b of the stop switch S2 to the supply terminal $\phi 3$.

When the contactor K1 is energized over the circuit just described, a stick circuit around the start switch S1 is completed over the front contact K1*d* of the contactor K1.

At the same time, operating current for the motor M1 is supplied to the terminals 4, 5, and 6 of the motor M1 over the front contacts K1*a,* K1*b* and K1*c,* respectively.

A front contact repeater relay K1R is provided that has a winding 70. The relay K1R is picked up when the contractor K1 is energized over a circuit that extends from the supply terminal $\phi 2$, through the winding 70, and thence over the front contacts K1*c* of the contactor K1 to the supply terminal $\phi 3$. The relay K1R is provided in order to prevent full line voltage from being applied to a braking circuit, to be described, and to avoid a live source terminal connection to the motor when all power is off. For these purposes, the relay K1R is provided with three back contacts K1R*a,* K1R*b* and K1R*c* that are closed when the relay K1R is de-energized.

A motor motion sensing circuit extends from the terminal 5 of the motor M1 through the winding 8 of a relay K2, thence to the junction 9 of a pair of capacitors C1 and C2. The other terminal of the capacitor C1 is connected to the terminal 4 of the motor M1. The other terminal of the capacitor C2 is connected to the terminal 6 of the motor M1.

A braking circuit is provided that extends from the supply terminal $\phi 1$ through a current limiting capacitor C3, paralleled by a relatively large capacitor discharging resistor R1, over back contacts K1R*a* of the relay K1R, over the contacts S2*a* of the stop switch S2 in its STOP position to terminal 4 of the motor, and thence from terminal 4 of the motor to terminal 6 of the motor over three parallel paths. The first path extends through the winding 1. The second path extends through the windings 3 and 2 in series. The third path extends from terminal 4 of the motor M1 over the contacts S2*a* of the stop switch S2 in its STOP position, through a rectifying diode D1, and thence over back contacts K1R*b* of the relay K1R to terminal 6 of the motor M1.

From the terminal 6 of the motor M1, the braking circuit continues over the back contacts K1R*c* of the relay K1R, over the normally open-front contact K2*a* of the relay K2, closed in the energized state of the relay K2, and thence over the contacts S2*b* of the stop switch S2*b* in its STOP position to the terminal $\phi 3$ of the source. This circuit supplies DC braking current to the motor M1 when the stop switch S2 is moved to its STOP position, when the relay K2 is energized, after the contactor K1 has opened its front contacts and the relay K1R has then closed its back contacts, and thereafter until the relay K2 is released.

When operating current is supplied to the terminals 4, 5 and 6 of the motor M1 over the front contacts of the contactor K1 as described above, there is a voltage developed between the terminals 5 and 9 because the resultant of the voltages at the terminals 4 and 6 is opposite to but greater than the voltage at the terminal 5. For similar reasons, when pulsating braking current is supplied through the braking circuit just described, and the rotor of the motor M1 is still moving, an unbalanced voltage is developed between the terminals 5 and 9 by reason of the flux induced in the moving rotor windings. On the other hand, when pulsating DC braking current is supplied and the rotor of the motor M1 is stopped, both the single phase alternating component of the pulsating DC braking current applied between the terminals 4 and 6 through the motor windings, and the DC component, see the terminals 5 and 9 as balanced points on a bridge, and no voltage is developed between the terminals 5 and 9. Thus, the winding of the relay K2 sees the terminals 5 and 9 as a current source when the rotor of the motor M1 is in rotation and either the motor is supplied with operating current from the source terminals $\phi 1$, $\phi 2$ and $\phi 3$, or the motor is supplied with braking current. Thus, the relay K2 serves as a rotor motion detector.

The open circuit voltage between the terminals 5 and 9 during operation of the motor M1, without the relay K2, would be very much larger than the open circuit voltage near the point at which the rotor stops during braking. Thus, it is highly desirable to limit the current supplied to the winding of the relay K2 during motor operation. For this purpose, it is preferred to make the relay K2 ferroresonant with the parallel combination of the capacitors C1 and C2 at a frequency to be described and at a voltage near the drop-out value for the relay K2.

The frequency at which the relay K2 is made ferroresonant is related to the frequency of the source, but more specifically it is determined as the fundamental frequency of the ripple component of the output voltage of the rectifier that is used to supply the DC braking current. In particular, it is the supply voltage frequency for the half wave rectifier shown in FIG. 1. For a full wave rectifier, as described below in connection with FIG. 2, it would be twice the line frequency.

For the purposes of a ferroresonant design, the relay K2 is preferably made with a core of ferrite, Permalloy or the like that will saturate at a relatively low flux density; i.e., 4000 gauss for ferrites, or 6500 gauss for Permalloy, as opposed to 18,000 guass for the low silicon steel usually employed.

The inductance of a relay is at its maximum when the voltage across its winding is near the dropout value. At higher voltages, as the winding saturates, the inductance goes down and the relay winding will move away from ferroresonance with the capacitors, thus causing more of the voltage to appear across the capacitors, and less across the relay. This phenomenon has been known, per se, for many years, and is discussed, for example, in an article by C. G. Suits entitled *Non-Linear Circuits Applied to Relays,* which appeared in the April 1973 issue of *Electrical Engineering.* Applications of the principles involved, however, have tended in recent times to be limited to constant voltage devices, or to constant current devices, as set out on pages 31–57 of *Nonlinear-Magnetic Control Devices,* by William A. Geyger, published by McGraw Hill Book Co. of New York, N.Y., in 1964. For example power transformers for color television receivers and microwave ovens are conventionally made insensitive to line fluctuations by ferroresonant techniques.

As a practical matter, it is not a simple task to design a relay for use in the apparatus of the invention. An approximately correct value for the maximum inductance of the relay at its desired dropout vale, for the capacitors of given size, or for the capacitors, given the relay characteristics, obviously be obtained from the relationship $\omega^2 = 1/LC$, where $\omega$ is the frequency in radians per second, L is the inductance in henries, and C is the capacitance in farads. But the wide variety of relay characteristics encountered in practice, and the fact that performance specifications are not usually available in either the detail nor the form required for a design calculation that would take into account all of the factors involved, make values obtained in this fashion inadequate for more than a first approximation. I have discovered that this problem can be resolved most expeditiously by starting with a relay of appropriate approximate specifications; i.e., with a dropout voltage toward the lower end of the rotor motion induced signal voltage, i.e., 1 or 2 volts or less, and an inductance at the motor frequency but below saturation that is resonant with a capacitor of reasonable size. This relay is then connected in the particular motor braking circuit in which the system of the invention is to be installed, in series with an adjustable capacitor bank. The energizing circuit for the relay is held closed. A variable signal is then applied across the series combination of variable capacitor and relay. The capacitance is varied while the signal voltage is varied to maintain the voltage across the relay near its dropout value, until the minimum signal is found at which the dropout value across the relay is obtained. About twenty percent smaller than the capacitance at which this minimum value of the signal voltage is obtained will be the optimum value of the capacitance of the capacitors C2 and C3 in parallel to reduce relay coil heating at high signal voltage.

Operation of the circuit of FIG. 1 just described will be generally apparent from the above description of its construction, but will next be described, beginning with the assumptions that the stop switch S2 is in the position shown, that the start switch S1 is open, that the motor is stopped, and that the contactor K1 and the relays K1R and K2 are de-energized.

Assume that the start switch S1 is momentarily depressed. The contactor K1 will now be energized over its pickup circuit extending from the supply terminal $\phi 2$ over the contacts of the start switch S1, and thence through the winding 7 of the contactor K1 and over the normally closed contacts S2b of the stop switch S2 in its RUN position to the supply terminal $\phi 3$.

The relay K1 will now be held up over its stick circuit completed over its own front contact K1d around the start switch S1. The start switch S1 will return to its open position, and plays no further part in the operation of the circuit until again manually actuated after the stop switch S2 has been returned to its RUN position.

When the front contacts of the contactor K1 close, the repeater relay K1R will be energized over the circuit described above, and open its back contacts to disable the braking circuit described above as long as the contactor K1 is energized and until both the contactor K1 has opened its front contacts and the relay K1R has been released.

When the contactor K1 is energized to operate the motor M1 in the manner just described, voltage will be developed across the terminals 5 and 9 as described above, causing operating current to flow through the winding 8 of the relay K2. The front contacts K2a of the relay K2 will be closed, enabling the braking circuit. The braking circuit will remain open at this time with the contacts S2a of the STOP switch S2 in their RUN position and the back contacts of the relay K1R open.

When the stop switch S2 is moved to its STOP position, the energizing circuit for the contactor K1 will be interrupted, and its contacts K1a, K1b and K1c will open. Residual flux will keep the relay K2 energized during the brief transition before the contacts of the stop switch are closed in their STOP position, until the front contacts of the contactor K1 open and de-energize the relay K1R, and thereafter until the back contacts of the relay K1R close, whereupon the braking circuit will be established from terminal $\phi 1$ of the source through the capacitor C3 in parallel with the resistor R1, over the back contacts K1Ra of the relay K1R, over the contacts through S2a of the stop switch S2 in their STOP position, through the diode D1 in parallel with the windings of the motor M1 to the terminal 6, over the back contacts K1Rb of the relay K1R, over the back contacts K1Rc of the relay K1R, over the front contacts K2a of the relay K2, and over the contacts S2b of the stop switch S2 in its STOP position to the terminal $\phi 3$.

Voltage induced in the winding 8 of the relay K2 will be maintained as long as the rotor of the motor is in motion and braking current is supplied. The division of voltage between the winding 8 and the capacitors C1 and C2 will shift while the induced voltage is decreased as the rotor slows, because of the shift toward ferroresonance as the winding 8 becomes desaturated. Accordingly, the relay K2 will not drop out to interrrupt the braking circuit until the rotor of the motor M1 is essentially at a standstill. The braking action can be very abrupt, or as gradual as is desired, depending on the choice of the braking current limiting capacitor C3.

Figure 2:
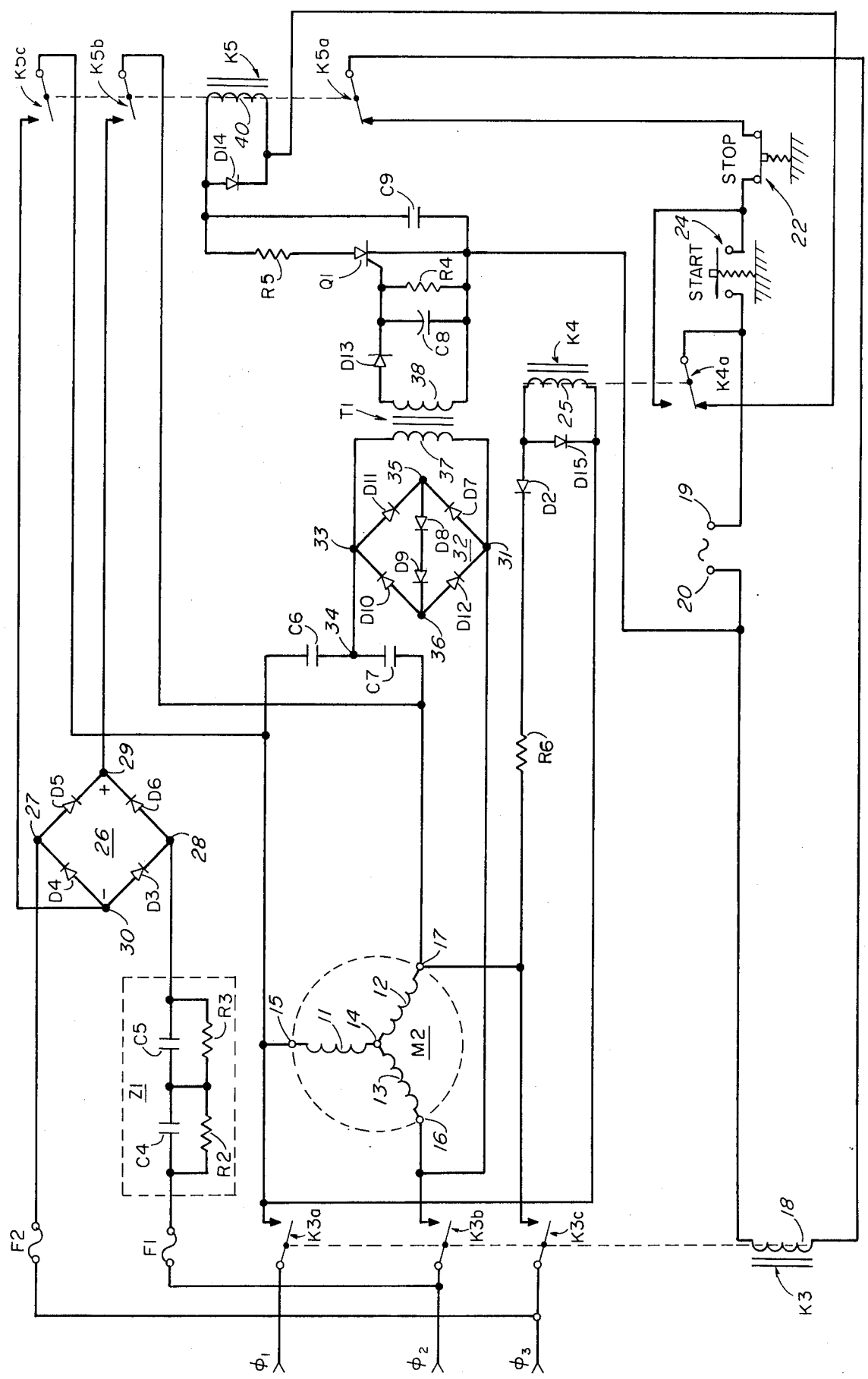
FIG. 2 is a schematic wiring diagram of a brake control system for a three phase motor in accordance with a second and presently preferred embodiment of my invention.

FIG. 2 shows a presently preferred embodiment of my invention especially adapted for use with industrial motors, homeowner's power tools, and the like, in the 220-480 volt range. In such applications, it is desirable to operate the control and sensing circuits from the 120 volt, 60 Hz source that is commonly available, and which is represented in FIG. 2 by the source terminals 19 and 20. As in FIG. 1, the three-phase motor supply source is represented by its terminals $\phi 1$, $\phi 2$ and $\phi 3$.

A conventional three phase induction motor M2, here shown as Y-connected, has a conventional rotor, provided with the usual squirrel cage windings, not shown but suggested by the dotted circle around the stator windings 11, 12 and 13. The common terminal 14 is assumed to be inaccessible.

The motor M2 has accessible external terminals 15, 16 and 17 that are arranged to be energized from the supply terminals $\phi 1$, $\phi 2$ and $\phi 3$ over the normally open front contacts K3a, K3b and K3c, respectively, of a conventional contactor K3 when the winding 18 of the contactor K3 is energized in a manner to be described.

The contactor K3 has an energizing circuit that is at times completed from the 120 volt source terminal 19 over the contacts of a manually operated, normally open spring-returned START pushbutton 24; over the normally closed contacts of a manually operated, spring-returned STOP pushbutton 22; over the back contact K5a of a relay K5, to be described, closed when the relay K5 is de-energized; through the winding 18 of the contactor K3, and thence to the source terminal 20. When the contactor K3 is energized over this circuit, the motor M2 will be energized over the front contacts K3a, K3b and K3c of the contactor K3 as described above.

With the contactor K3 energized, a pickup circuit for a repeater relay K4 will be completed. The relay K4 is preferably a DC relay having a winding 25 and transfer contacts K4a shown in the position assumed when the relay K4 is de-energized. The pickup circuit for the relay K4, when completed, extends from the supply terminal $\phi 1$ over the front contact K3a of the contactor K3, through the winding 25 of the relay K4, through a rectifying diode D2, through a current limiting resistor R6, and thence over the front contact K3c of the contactor K3 to the supply terminal $\phi 3$. A conventional commutating diode D15 is preferably connected in parallel with the winding 25 as shown.

When the relay K4 is energized over the circuit just described, its front contacts K4a shunt the START pushbutton switch 24 so that the circuit for the winding 18 of the contactor K3 is maintained despite the release of the START pushbutton by the operator. At the same time, the back contacts K4a are opened to disable a pickup curcuit for a motion sensing relay K5, to be described.

DC braking current for the motor M2 is at times made available from a full wave rectifier generally designated 26 and comprising four diodes D3, D4, D5 and D6 connected in conventional fashion between AC supply terminals 27 and 28 and positive and negative DC output terminals 29 and 30, respectively, as shown. The supply terminals 27 and 28 of the rectifier 26 are arranged to be normally energized over a circuit extending from the supply terminal $\phi 2$ through a fuse F1, through a braking current limiting impedance Z1, to be described, to the supply terminal 28 of the rectifier 26, and over a return path from the supply terminal 27 of the rectifier through a fuse F2 to the source terminal $\phi 3$. The fuses F1 and F2 are optional, but preferred.

The current limiting impedance Z1 can be a resistor, but is preferably a capacitor, and most preferably a pair of capacitors C4 and C5 in series and each paralleled by a resistor R2 and R3, respectively, as shown. The capacitance in the impedance Z1 provides braking current limiting without undue power loss, while the resistors serve to prevent a large and possibly destructive voltage across either capacitor in the event of leakage in the other, thus permitting a lower working voltage rating for the capacitors.

A significant advantage in the choice of the capacitors C4 and C5 and the resistors R2 and R3, together with the resistor R6, as separate components is that these components may be offered, together with the other elements of the braking system, as a kit to permit conversion to either 240 or 480 volt operation. Three phase motors are currently sold with terminals permitting the motors to be operated from either a 240 volt or a 480 volt source, depending on the junction box connections made at the time of installation. The arrangement shown, if suitably designed for 480 volt operation, is readily converted for 240 volt motor installation.

It has been found that a 240 volt brake system conversion can be made from the circuit shown by rewiring the impedance Z1 with the resistors R2 and R3 and the capacitors C4 and C5 all connected in parallel. For the same purpose, the resistor R6 can be shunted, or simply omitted. Thus, if the braking system is made and sold as a kit with these parts to be connected at the time of installation, either a 240 volt or a 480 volt system can be provided for with the same components.

The braking circuit rectifier 26 is shown energized by the high voltage supply terminals $\phi 2$ and $\phi 3$. Alternatively, it could be energized from the low voltage terminals 19 and 20, as will be apparent to those skilled in the art.

A DC braking circuit for the motor M2 is at times completed from the positive rectifier output terminal 29 over a front contact K5b of the relay K5, closed when the relay K5 is energized, through the windings 12 and 11 of the motor M2 in series, and thence over a front contact K5c of the relay K5, closed when the relay K5 is energized, to the negative output terminal 30 of the rectifier 26.

A clamped motion sensing circuit extends from the terminal 16 of the motor M2 to one terminal 31 of a voltage limiting diode bridge generally designated 32, to be described, and from a second terminal 33 of the diode bridge 32 to the junction 34 of a pair of capacitors C6 and C7. The other terminal of the capacitor C6 is connected to the motor terminal 15, and the other terminal of the capacitor C7 is connected to the motor terminal 17, as shown. While the motor is in operation, and receiving either operating current from the source terminals $\phi 1$, $\phi 2$ and $\phi 3$, or braking current from the rectifier 26, over any of the circuits described above, an alternating potential will be developed between the terminals 16 and 34 in the manner and for the reasons described above in connection with FIG. 1.

The diode bridge 32 comprises for diodes D7, D8, D9 and D10 connected in series and oriented in the same direction to conduct current from the terminal 31 to the terminal 33 when the terminal 16 is positive with respect to the terminal 34. A diode D11 has its anode connected to the terminal 33 and its cathode connected to the junction 35 of the diodes D7 and D8. Similarly, a diode D12 has its cathode connected to the terminal 31, and its anode connected to the junction 36 of the diodes D9 and D10. Thus, when the terminal 34 is positive with respect to the terminal 16, current flows from the terminal 34 through the diodes D11, D8, D9 and D12 in series to the terminal 31. The voltage between the terminals 31 and 33 is limited to four forward-biased diode junction gaps in series; i.e., from about 1½ to 2 volts, by this arrangement.

The primary winding 37 of a transformer T1 is connected between the terminals 31 and 33 of the voltage limiting diode bridge 32 just described. Preferably, the winding 37 is made ferroresonant with the parallel combination of the capacitors C6 and C7 in the manner and for the reasons described above in connection with the circuit for the relay K2 in FIG. 1.

The transformer T1 is provided with a secondary winding 38 that is connected in a storage and sensing circuit next to be described. As will appear, this circuit comprises a silicon controlled rectifier Q1 that at times enables the relay K5 to be picked up.

The upper terminal of the secondary winding 38 of the transformer T1 is connected to the anode of the diode D13 that has its cathode connected to the gate input terminal of the controlled rectifier Q1. The lower terminal of the winding 38 is connected to the cathode load terminal of the controlled rectifier Q1.

A storage capacitor C8 is connected between the gate terminal of the controlled rectifier Q1 and its cathode, in parallel with a resistor R4. The resistance of the resistor R4 and the capacitance of the capacitor C8 are selected to establish a time constant for the gate circuit of the silicon controlled rectifier Q1 that will prevent the controlled rectifier from being unduly sensitive to transients and will allow it to be turned on a short time after motor current is interrupted, while allowing it to be shut off quickly in response to cessation of signal.

The cathode of the controlled rectifier Q1 is connected to the source terminal 20. The anode of the controlled rectifier Q1 is at times returned to the source terminal 19 over a circuit that extends through a current limiting resistor R5, through the winding 40 of a conventional DC relay K5, and over the back contacts K4a of the relay K4 to the source terminal 19. A commutating diode D14 is connected across the winding 40 of the relay K5, and a relatively small bypass capacitor C9 is connected across the series combination of the resistor R5 and the local path through the controlled rectifier Q1, as shown.

Suitable components for use in the circuit of FIG. 2 with a 480 volt, 60 Hz three phase source and a 120 volt, 60 Hz single phase source are as follows:

C4, C5 = 100 mfd., 230 volt AC electrolytics
C6, C7 = 2 mfd., 440 volt oil-paper capacitors matched to ≅ 5%
C8 = 30 mfd., 10 volt electrolytic
C9 = 0.0022 mfd., 3000 volt ceramic
D2, D3 = 1N4006
D7, D8,
D9, D10,
D11, D12 = 1N4001
D13, D14 = 1N4004
R2, R3 = 9.1K, 20%, 2 watt
R4 = 22 ohm, 20%, 1 watt
Q1 = GE C106C
T1 = 1.5 to 2 volt, 120 Hz, 5000 ohm, ferrite cored transformer
Rectifier 26 = WEMCO MB12A25V80

Operation of the circuit of FIG. 2 will be generally apparent to those skilled in the art from the above description. Operation will next be briefly described, beginning with the assumption that the parts are in the positions shown with the motor M2 and other components de-energized and the rotor of the motor M2 at rest.

Assume that the start button 24 is briefly depressed. The winding 18 of the contactor K3 will now be energized over its pickup circuit extending from the source terminal 19 over the closed contacts of the start switch 24, over the normally closed contacts of the stop switch 22, over the normally closed back contacts K5a of the relay K5, and thence through the winding 18 of the relay K3 to the source terminal 20.

The front contacts K3a, K3b and K3c of the contactor K3 will close, causing the windings 11, 12 and 13 to be energized from the source terminals φ1, φ2 and φ3. The relay K4 will be picked up over the circuit described above, closing its front contacts K4a to complete a stick circuit around the start switch 24, and disabling the pickup circuit for the relay K5.

During operation of the motor, a voltage signal will be developed between the terminals 16 and 34, limited by the diode bridge 32 to about 2 volts or less, that will cause current to flow through the primary winding 37 of the transformer T1. Induced voltage in the secondary winding 38 of the transformer T1 will cuase charging of the capacitor C8 on pulses of appropriate amplitude and polarity to pass through the diode D13. Gate current will accordingly flow from the gate terminal of the controlled rectifier Q1 to its cathode, enabling the controlled rectifier Q1 to be turned on. However, the controlled rectifier Q1 will not conduct load current at this time, because its anode circuit is interrupted at the open back contacts K4a of the repeater relay K4.

Assume next that the stop button 22 is briefly depressed. The energizing circuit for the contactor K3 will be interrupted, and its front contacts K3a, K3b and K3c will open to interrupt the flow of operating current to the motor M2, and release the relay K4.

When the winding 25 of the relay K4 is de-energized in the manner just described, its front contacts K4a will close, allowing the controlled rectifier Q1 to conduct on positive half cycles of the supply voltage on the terminal 19. Gate current for the controlled rectifier Q1 will be continued during the brief interval before the back contacts of the relay K4a are closed, the controlled rectifier Q1 conducts, and the relay K5 is energized to commence the flow of braking current to the motor, because of the gate current storage effort of the capacitor C8. In addition, most motors will produce enough induced electrical noise when their energizing circuits are interrupted to keep the transformer T1 energized for enough time to allow the controlled rectifier Q1 to be turned on without any specific gate storage mechanism.

Conduction of the controlled rectifier Q1 in the manner just described will cause the relay K5 to be picked up over the circuit extending from terminal 20 of the 120 volt source, from the cathode to the anode of the controlled rectifier Q1, through the circuit limiting resistor R5, through the winding 40 of the relay K5, and thence over the back contacts K4a of the relay K4 to the source terminal 19. Back contact K5a of the relay K5 will open, and front contacts K5b and K5c will close to supply braking current from the rectifier 26 to the windings 11 and 12 of the motor M2.

The rotor of the motor M2 will be braked to a stop with an abruptness determined by the current limiting impedance Z1. By making the capacitors C4 and C5 smaller, a slower and softer braking action can be provided; if desired, however, the motor can be stopped very quickly.

As long as the rotor of the motor M2 is in motion, the braking current supplied to its windings will cause a voltage to be induced between the rotor motion sensing terminals 16 and 34. As the rotor slows and the induced voltage becomes smaller, the primary winding 37 of the transformer T1 will approach ferroresonance with the capacitors C6 and C7. Thus, more of the signal voltage will appear across the winding 37, and less across the capacitors C6 and C7 as the null is approached. This action makes it possible to keep the relay K5 energized until very near the exact time when the rotor reaches a halt. A few milliseconds early or late will not make any significant difference, as in the first case the motor is decelerating, and in the second case the time is too short to permit overheating. The important point is that motion detection is effective down to very low angular velocities of the rotor.

Figure 3:
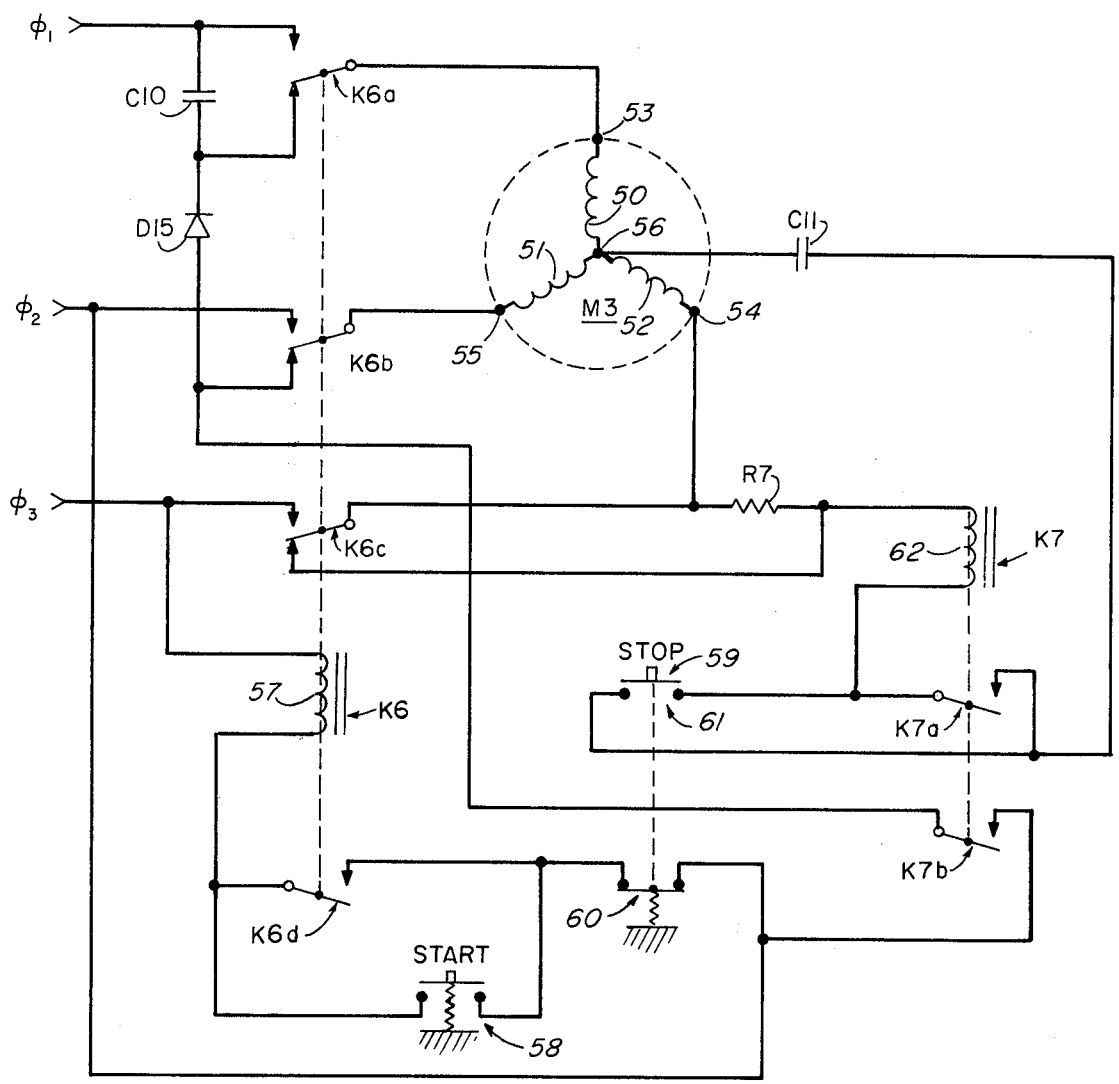
FIG. 3 is a schematic wiring diagram of a braking system for motors having terminals available for access to individual windings in accordance with a third embodiment of my invention.

FIG. 3 shows an embodiment of my invention adapted for use with motors having an accessible neutral terminal. Again, a conventional three phase source is indicated by its supply terminals φ1, φ2 and φ3. A motor M3 of the Y-connected type is shown, having windings 50, 51 and 52 with supply terminals 53, 54 and 55, respectively, and an accessible common neutral terminal 56.

The motor M3 is at times energized from the source over circuits completed when a contactor K6 is energized. The contactor K6 has three transfer contacts K6a, K6b and K6c, and a front contact K6d. Contactors suitable for motor control and having back contacts are available, and are used where motor rotation direction reversal is desired. This construction would be preferred for use use in embodiments of my invention where reversal was required. However, such contactors are quite expensive, and in most instances back contacts of a K6 repeater relay, such as K4 in FIG. 2, would be more economical to employ. The circuit of FIG. 3 is shown as more simply illustrating the principles involved.

The winding 57 of the contactor K6 is at times energized over a circuit extending from the supply terminal φ3 through the winding 57, over the contacts of a START switch 58 that are closed when the switch 58 is manually depressed, and over the normally closed contacts 60 of a manually operated, double pole, single throw, spring-returned stop switch 59 to the supply terminal φ2. Once the contactor K6 is energized over this circuit, its front contacts K6a, K6b, K6c and K6d will close. Operating current will now be supplied from terminal φ1 of the source over front contacts K6a L to motor terminal 53, from terminal φ2 of the source over front contacts K6b to motor terminal 55, and over front contacts K6c to motor terminal 54. A stick circuit around the spring-returned start switch 58 will be completed over front contact K6a. The back contacts K6a, K6b and K6c of the contactor K6 may be arranged to open shortly before the front contacts are closed.

A braking circuit for the motor M3 is at times completed over a circuit that extends from the supply terminal φ1, through a braking current limiting capacitor C10, thence through parallel paths, one including a rectifier here shown as a diode D15, and the other extending over back contacts K6a of the contactor K6 through the windings 50 and 51 of the motor M3 and over back contacts K6b of the contactor K6, and thence over the front contacts K7b of a rotor motion detection relay K7, to be described, to the supply terminal φ2.

The motion detection relay K7 has a winding 62 that is at times energized over one of three circuit paths. The first is a pickup circuit that extends from terminal φ3 of the source over the front contacts K6c of the contactor K6, through a current limiting resistor R6, through the winding 62 of the relay K7, over the contacts 61 of the stop switch 59 in its depressed position, through a capacitor C11 to the neutral terminal 56 of the motor M3, and thence over two paths, one to the terminal φ1 through the winding 50 of the motor and over front contacts K6a of the contactor K6, and the other through the winding 51 of the motor and over front contacts K6b of the contactor K6 to the supply terminal φ2. This circuit is effective to pick up the relay K7 and keep it energized during the brief interval between the closing of the stop switch 59 and the release of the contactor K6 with the resultant opening of its front contacts.

The second circuit path effective to energize the winding 62 of the relay K7 is completed when the contactor K6 is de-energized while the contacts 61 of the stop switch 59 are still closed. This circuit extends from the motor terminal 56 through the capacitor C11, over the contacts 61 of the stop switch 59, through the winding 62 of the relay K7, over the back contacts K6c of the contactor K6, and through the winding 52 of the motor M3 back to the neutral terminal 56 of the motor M3. This circuit is effective to keep the relay K7 energized so long as the stop switch 59 is depressed and the rotor of the motor M3 is in motion to cause a voltage to be induced across the winding 52 by the supply of braking current in the presence of rotor motion.

The third energizing circuit for the relay K7 is a stick circuit that is the same as the second circuit just described except that the contacts 61 of the stop switch 59 are bypassed by the front contacts K7a of the relay K7 when the relay K7 is energized as just described.

The winding 62 of the relay K7 is made ferroresonant with the capacitor C11 in the manner and for the purpose described above. This arrangement makes it possible to ensure that the motor is stopped, but that overheating of the motor will not occur. It will be apparent to those skilled in the art from the above description that even more sensitive control over the braking process can be achieved if an SCR driven by a ferroresonant transformer, as described above in connection with FIG. 2, is used to control the relay K7.

One aspect of the circuits of FIGS. 1–3 just described deserves mention, as it relates to the safety of the apparatus in use. This is the fact that if a power failure occurs during motor operation, the motor will not restart when power is restored unless the start switch is depressed.

Operation of the circuit of FIG. 3 will be generally apparent to those skilled in the art from the above description, but will be briefly described, beginning with the assumption that all components are de-energized, and that the parts are in the positions shown.

When the start switch 58 is manually depressed, the contactor K6 will be energized to supply operating current to the motor M3 over the circuits described above. The relay K7 will be de-energized, with its various energizing circuits interrupted by the open contacts 61 of the stop switch 59 and its own normally open front contacts K7a.

With the motor M3 in operation, closure of the stop switch 59 will complete the first pickup circuit for the relay K7 described above. In rapid succession, the front contacts K6a, K6b and K6c of the contactor K6 will open, the back contacts will close to complete the braking circuit for the motor and the second energizing circuit for the relay K7 described above, and the rotor of the motor M3 will will be braked to a stop.

During the interval in which the rotor is being decelerated, voltage induced in the winding 52 will be progressively diverted from the capacitor C11 to the winding 62 of the relay K7 as the winding 62 approaches ferroresonance with the capacitor C11, as described above. This effect allows a sensitive determination of the null even when the current limiting capacitor C10 is made rather small to permit a gradual braking action.

While I have described my invention with reference to the details of various illustrative embodiments, many changes and variations will be apparent to those skilled in the art upon reading this description. Such can obviously be made without departing from the scope of my invention.

Having thus described my invention, what I claim is:

1. A braking system for three phase motors having at least first, second and third accessible terminals, comprising a pair of impedances connected in series across said first and second terminals, voltage sensing circuit means connected between said third terminal and the junction of said impedances for producing a first signal in responce to a voltage therebetween, and means responsive to an applied signal in the presence of said first signal for supplying direct current to a pair of said first and second terminals.

2. A motion detection circuit for a three phase induction motor having first, second and third current supply terminals, comprising first and second capacitors connected in series between said first and second terminals, inductive circuit means connected between said third terminal and the junction of said capacitors, and means responsive to a voltage above a predetermined threshold value applied to said inductive circuit means for producing an output signal, in which said inductive circuit means is ferroresonant with the parallel combination of said capacitors at a voltage near said threshold value.

3. A braking system kit for a polyphase induction motor adapted for wiring at a predetermined frequency and at a first voltage, said kit comprising a pair of capacitors, a pair of resistors, a rectifier, a motor operation sensing circuit adapted to be connected to said motor, and control circuit means adapted to be connected to supply current from an alternating source to said motor through said rectifier as long as motor operation is sensed by said operation sensing circuit, whereby the motor can be adapted for braking at said first voltage by connecting said resistors in parallel with said capacitors and said capacitors in series with said source and said rectifier, and the motor can be adapted for braking at said second voltage by connecting said resistors and said capacitors all in parallel and in series with said source and said rectifier.

4. In a braking system for induction motors having a rotor and a stator, at least first and second windings adapted to have a voltage induced across said first windings when pulsating direct braking current is supplied to said second winding and when and only when said rotor is in motion with respect to said stator, a rotor motion sensing circuit comprising a series combination of inductive and capacitive reactors in ferroresonance at a point near the point of zero relative motion between said rotor and said stator, and motion detecting means responsive to the voltage across said inductive reactor, for producing a first signal or a second signal according as the voltage across said inductive reactor in above or below a predetermined value, respectively.

5. A braking system for a polyphase induction motor having a rotor and a stator and at least first, second and third accessible terminals adapted to be connected to an alternating current source, comprising, in combination, first switching means operable from a first state to a second state, second switching means operable from a first state to a second state, first circuit means controlled by said first switching means in its second state and said second switching means in its first state for supplying operating current from said source to said terminals, third switching means operable from a first state to a second state, second circuit means controlled by said first switching means in its first state, said second switching means in its second state, and said third switching means in its first state for supplying pulsating direct current to at least said first terminals, and ferroresonant circuit means connected to at least a pair of said terminals and responsive to pulsating direct current supplied to said first and second terminals for operating said third switching means to its second state when the voltage across said pair of terminals falls below a predetermined value.

6. A braking circuit for three phase motors having at least first, second and third accessible terminals, comprising a pair of capacitors connected in series between said first and said second terminals, an inductive circuit element connected between said third terminal and the junction of said capacitors, and means controlled by the voltage across said inductive elements and by an applied signal for supplying pulsating direct braking current to at least two of said terminals so long as the voltage across said inductive element is above a predetermined value.

7. The apparatus of claim 6, in which said inductive element is ferroresonant with said capacitors.

8. A braking system for a polyphase motor having a rotor and a stator and a plurality of windings at least a first of which is excited with alternating current when pulsating direct braking current is supplied to at least one of said windings and said rotor is in motion with respect to said stator, comprising ferroresonant circuit means connected to said first winding for producing a first signal or a second signal according as said first winding is or is not excited, and means operable to apply pulsating direct braking current to at least said one of said windings when and only when said first signal is present.

* * * * *